(12) United States Patent  (10) Patent No.: US 8,715,023 B2
Montero  (45) Date of Patent: May 6, 2014

(54) PERSONAL EMERGENCY VESSEL/SHELTER

(75) Inventor: Cecilia Francina Montero, Wonder Lake, IL (US)

(73) Assignee: Cecilia F Montero, Wonder Lake, IL (US)

( * ) Notice: Subject to any disclaimer, the term of this patent is extended or adjusted under 35 U.S.C. 154(b) by 78 days.

(21) Appl. No.: 13/474,925

(22) Filed: May 18, 2012

(65) Prior Publication Data

US 2013/0309923 A1 Nov. 21, 2013

(51) Int. Cl.
*B63C 9/00* (2006.01)
*B63C 9/02* (2006.01)

(52) U.S. Cl.
USPC .............................................. 441/80; 114/348

(58) Field of Classification Search
CPC ...................................... B63C 9/06; B63C 9/22
USPC ............................ 441/80, 87; 114/349; 5/629
See application file for complete search history.

(56) References Cited

U.S. PATENT DOCUMENTS 4,225,993 A * 10/1980 Hay ................................ 114/349
4,365,579 A * 12/1982 Perez, Jr. ....................... 114/349

* cited by examiner

*Primary Examiner* — Lars A Olson
*Assistant Examiner* — Andrew Polay

(57) ABSTRACT

The invention is both a functional piece of furniture, but also claims to serve as an emergency haven that can be used as a tornado shelter or as a floating device. The device may offer protection for people who may not have the ability to reach a shelter, due to physical handicaps, distance to shelter, and deficiencies in their habitats. It offers protection if airlifted and a shield against flying debris, in case of flood the top is detached and the bottom can be used as a canoe-shape floating device. The sofa is built with an aluminum titanium alloy covered in glass reinforced GRP; it is sized to accommodate two adults. It has ventilations slots covered with built-in air filters; it has removable cushions and non-removable foam padding. The device is equipped with a callout GPS and a safe storage compartment for valuables and medications.

1 Claim, 2 Drawing Sheets

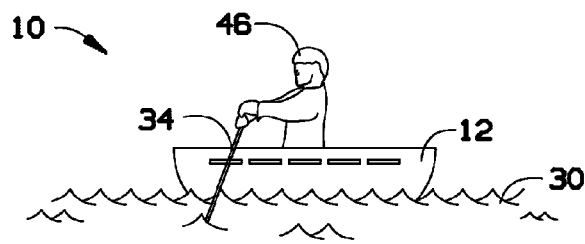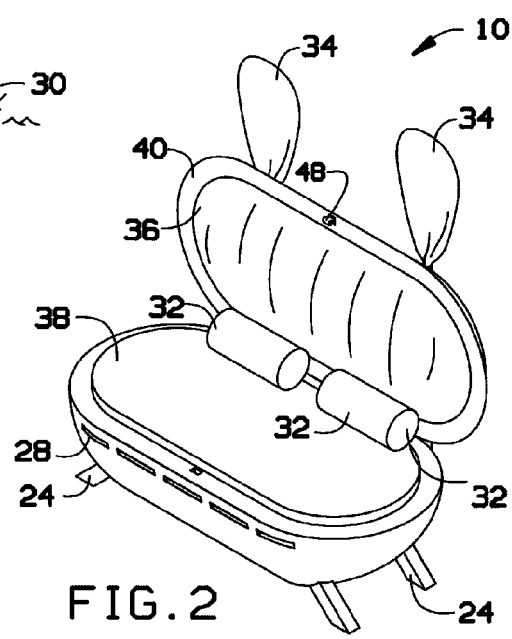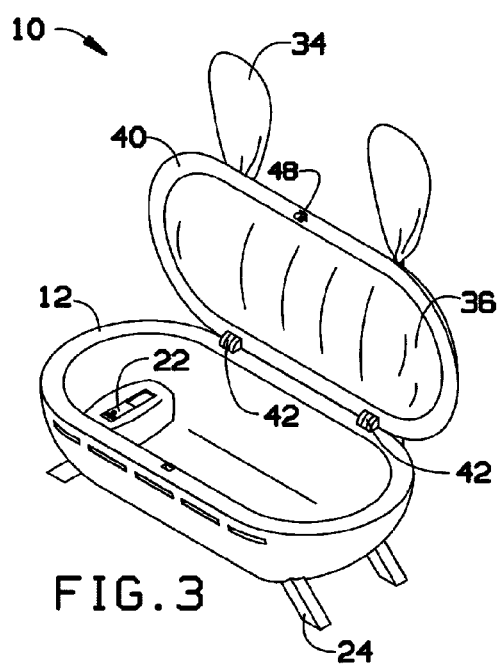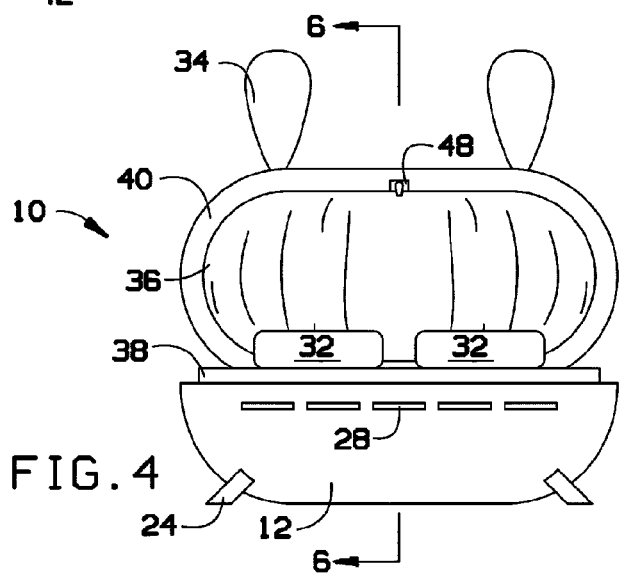

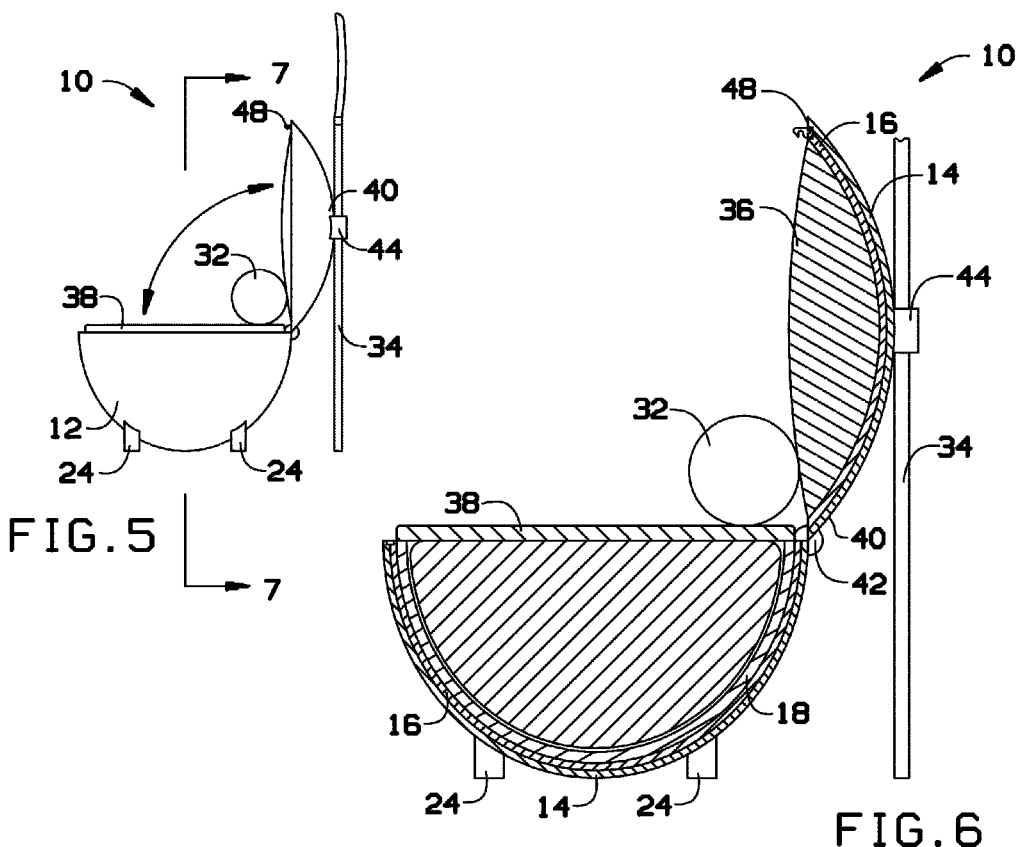
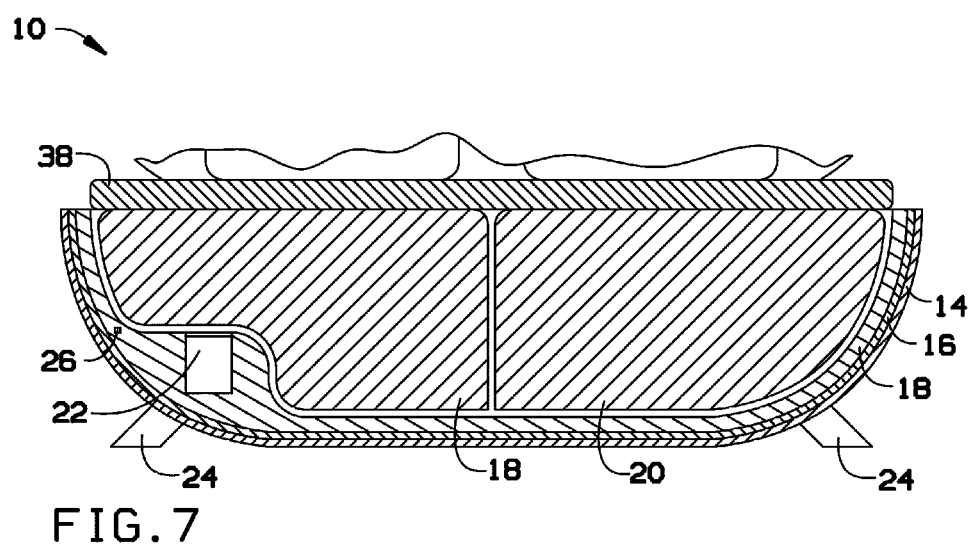

PERSONAL EMERGENCY VESSEL/SHELTER

BRIEF DESCRIPTION OF THE DRAWINGS

FIG. 1 is a side view of a personal emergency vessel/shelter (PEV) in use according to an embodiment of the present invention;

FIG. 2 is a perspective view of the PEV of FIG. 1;

FIG. 3 is a perspective view of the PEV without removable components of FIG. 1;

FIG. 4 is a front view of the PEV of FIG. 1;

FIG. 5 is a side view of the PEV of FIG. 1;

FIG. 6 is a section view of the PEV along line 6-6 of FIG. 4; and

FIG. 7 is a section view of the PEV along line 7-7 of FIG. 5.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention generally provides a personal emergency vessel/shelter device that may be used as a floating vessel or a tornado shelter. The device may offer protection for people who may not have the ability to reach a shelter, due to physical handicaps, distance to shelters, and deficiencies in their habitats.

Referring now to FIGS. 1-7, different views of a personal emergency vessel/shelter (PEV) 10 are shown according to an exemplary embodiment of the present invention. The PEV 10 may be a multilayer egg shaped device. The PEV 10 may be constructed from a fiberglass reinforced plastic layer 14 as an outside layer, and an inside titanium alloy skeleton layer 16. The PEV 10 may be sized to accommodate two adults. The PEV 10 may include a lower shell 12 and a removably attached upper shell (hatch) 40. The inside of the lower shell 12 may be covered with a non-removable foam padding 18. The foam padding 18 may make the lower shell 12 buoyant. A row of ventilation slots 28 may be formed close to a top edge of the lower shell 12. The ventilation slots 28 may be equipped with air filters (not shown). Two sets of removable cushions 38 and back-support pillows 32 may be disposed inside of the lower shell 12. The cushions 38 and back-support pillows 32 may provide comfort to occupants sitting in the PEV 10. One or more waterproof safe/storage compartment(s) 22 may be affixed inside to the bottom of the lower shell 12. The compartment(s) 22 may provide safe storage for first aid, medications and valuables. A global positioning system (GPS) device 26 may also be disposed in the lower shell 12. Four fin shaped breakable legs 24 may be attached to the bottom of the lower shell 12 to provide stability to the PEV 10 during storage. The hatch 40 may be attached to the lower shell 12 by hinges 42. A latch 48 may secure the hatch 40 to the lower shell 12. The latch 48 may be operated from both the inside and the outside of the PEV 10. A buckwheat cushion 36 may be affixed to an inside of the hatch 40. Paddle(s) 34 may be removably attached to an outside of the hatch 40 by paddle bracket(s) 44.

The PEV 10 may be stored in a place that is easily reachable in case of emergency, for example, in a center of a home. The PEV 10 may be used as follows. In case of a tornado, within minutes of tornado notification, some of the cushions 38 may be removed. A person seeking coverage may lay inside the PEV 10 the unit, may open the ventilation slots 28, may close the hatch 40 and may engages the latch 48. Once the hatch 40 is closed, the GPS device may automatically turn on. In case of a flood situation, the hatch 40 may be detached; the cushions 38 and pillows 32 may be removed, turning the lower shell 12 into a canoe-shape floating vessel. The paddles may allow user(s) to maneuver the vessel. The cushions 38 may also be used as floatation devices for people not fitting into the vessel.

The disclosed PEV 10 may be used in homes, schools, hospitals, and by the armed forces.

It should be understood, of course, that the foregoing relates to exemplary embodiments of the invention and that modifications may be made without departing from the spirit and scope of the invention as set forth in the following claims.

What is claimed is:

1. A personal emergency vessel/shelter device, comprising:
   a lower shell;
   (a) an upper shell adapted to be removably attached to the lower shell, wherein the upper shell and the lower shell together have an egg shape and the upper and lower shells have a fiberglass reinforced plastic outside layer and a metal alloy skeleton inside layer;
   (b) a non-removable padding disposed inside the lower shell to make the lower shell buoyant;
   (c) a set of removable padding and pillows disposed inside the lower shell;
   (d) a row of ventilation slots formed adjacent to a top edge of the lower shell where the slots extend along a majority of the length of a longitudinal side of the shelter;
   (e) a global positioning system device may also be disposed in the lower shell;
   (f) a releasably latch configured to secure the upper shell and lower shells together;
   (g) a waterproof safe device for providing storage for valuables and prescriptions.

\* \* \* \* \*